United States Patent
Hodgins et al.

(10) Patent No.: US 9,255,846 B1
(45) Date of Patent: Feb. 9, 2016

(54) DIGITAL TEMPERATURE DETERMINATION USING A RADIOMETRICALLY CALIBRATED AND A NON-CALIBRATED DIGITAL THERMAL IMAGER

(71) Applicant: LumaSense Technologies Holdings, Inc., Santa Clara, CA (US)

(72) Inventors: Peter Hodgins, Santa Clara, CA (US); Tim Dubbs, Santa Clara, CA (US); Stefan Warnke, Santa Clara, CA (US)

(73) Assignee: LumaSense Technologies Holdings, Inc., Santa Clara, CA (US)

( * ) Notice: Subject to any disclaimer, the term of this patent is extended or adjusted under 35 U.S.C. 154(b) by 19 days.

(21) Appl. No.: 14/334,133

(22) Filed: Jul. 17, 2014

(51) Int. Cl.
*G01D 18/00* (2006.01)
*G01J 5/10* (2006.01)
*G01J 5/02* (2006.01)
*G01J 5/00* (2006.01)
*G01J 5/08* (2006.01)

(52) U.S. Cl.
CPC .. *G01J 5/10* (2013.01); *G01J 5/025* (2013.01); *G01J 5/0003* (2013.01); *G01J 5/089* (2013.01); *G01J 2005/0048* (2013.01); *G01J 2005/0077* (2013.01)

(58) Field of Classification Search
CPC ............... G01J 2005/0077; G01J 2005/0048; G01J 5/0003; G01J 5/089; G01J 2003/2866
USPC ............................................... 250/330, 252.1
See application file for complete search history.

(56) References Cited

U.S. PATENT DOCUMENTS

| | | | |
|---|---|---|---|
| 7,683,321 B1 * | 3/2010 | King | H04N 5/33 250/252.1 |
| 2005/0029453 A1 * | 2/2005 | Allen | G01J 5/06 250/332 |
| 2010/0224772 A1 * | 9/2010 | Lemieux | G01D 18/008 250/252.1 |
| 2015/0009335 A1 * | 1/2015 | Strandemar | H04N 5/33 348/164 |

* cited by examiner

*Primary Examiner* — David J Makiya
*Assistant Examiner* — Kenneth J Malkowski
(74) *Attorney, Agent, or Firm* — Osha Liang LLP (57) ABSTRACT

A method, system, and non-transitory computer readable medium storing a plurality of computer executable instructions for calibrating an uncalibrated thermal imager is provided. The system includes a calibrated pyrometer for determining a first temperature of a Region of Interest under a first condition, and an uncalibrated thermal imager for determining a first average count value over the region of interest under the first condition and for determining a second average count value over the region of interest under a second condition. A temperature sensor for determining a second temperature of the region of interest under a second condition is also provided. Control electronics determine a Planck function that intersects the points (first temperature, first average count value) and (second temperature, second average count value). The uncalibrated thermal imager is calibrated using the Planck function.

20 Claims, 7 Drawing Sheets

DIGITAL TEMPERATURE DETERMINATION USING A RADIOMETRICALLY CALIBRATED AND A NON-CALIBRATED DIGITAL THERMAL IMAGER

BACKGROUND

Radiation pyrometers are instruments capable of non-contact temperature measurements of objects. Pyrometers measure the temperature of an object by measuring the intensity I and/or frequency v of a collected beam of the thermal radiation emitted by an object. Thermal radiation is defined to be the radiation that a body emits when it is at a temperature T. More specifically, the total power P emitted by an object at a temperature T is proportional to $\epsilon T^4$, where the emissivity $\epsilon$ is a nonzero constant that may take any positive value less than or equal to 1. Objects that are poor emitters of thermal radiation may have very low emissivities $\epsilon$. Alternatively, objects with an e of exactly 1 are called black bodies and emit a spectrum of thermal radiation having a distribution of intensities given by the equation $$I(v, T) = \frac{2hv^3}{c^2} \frac{1}{e^{hv/kT} - 1},\qquad(1)$$

where h is Plank's constant, c is the speed of light, k is Boltzmann's constant, T is the temperature of the black body, and v is the frequency of the emitted thermal radiation.

Figure 1A:
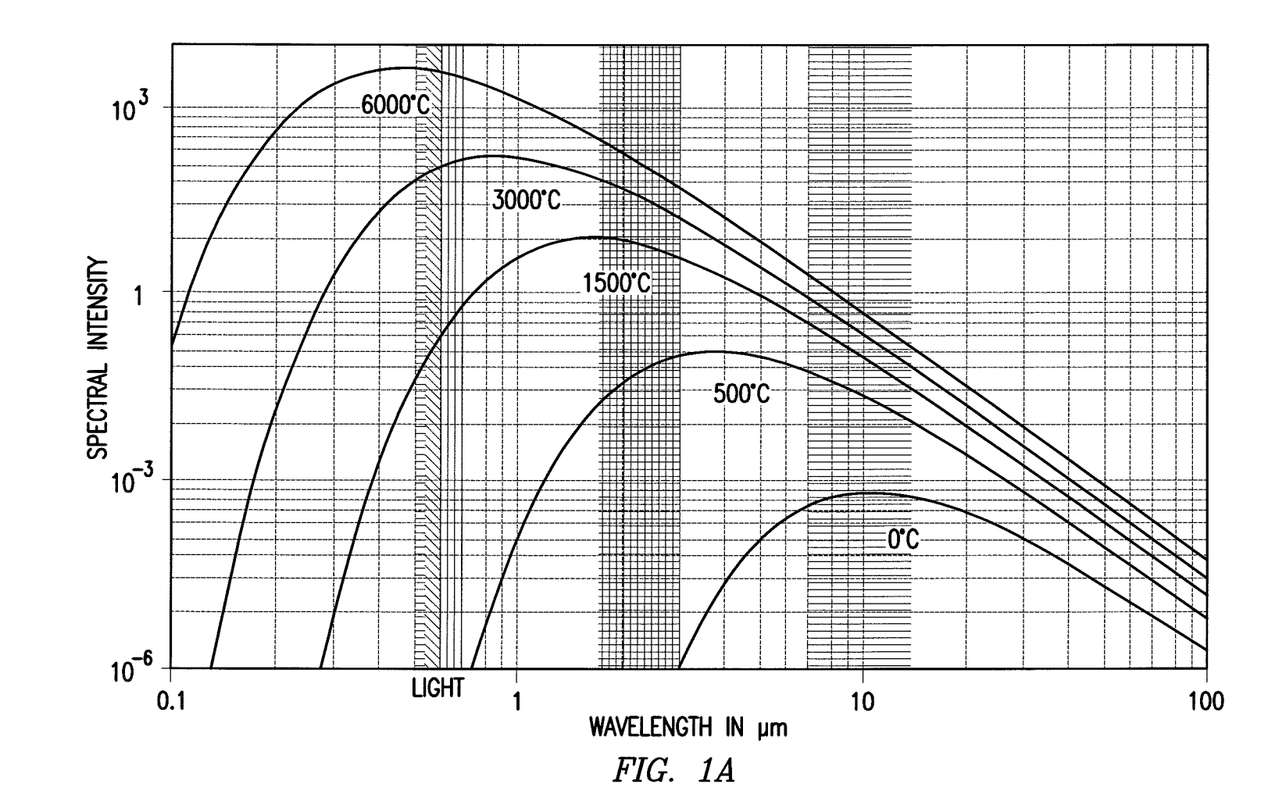
FIGS. 1A and 1B show examples of thermal emission spectra for several different types of objects at several different temperatures.

FIG. 1A shows examples of the thermal emission spectra predicted by (1) for a black body at several different temperatures. Further, FIG. 1A shows that a large fraction of the emitted thermal radiation from objects having temperatures in the range of 0-6000° C. is in the infra-red portion of the spectrum. In addition, FIG. 1A shows that as an object is heated, it will begin to emit a higher fraction of its thermal radiation within the visible and high energy (UV, x-rays, etc.) portions of the spectrum.

Figure 1B:
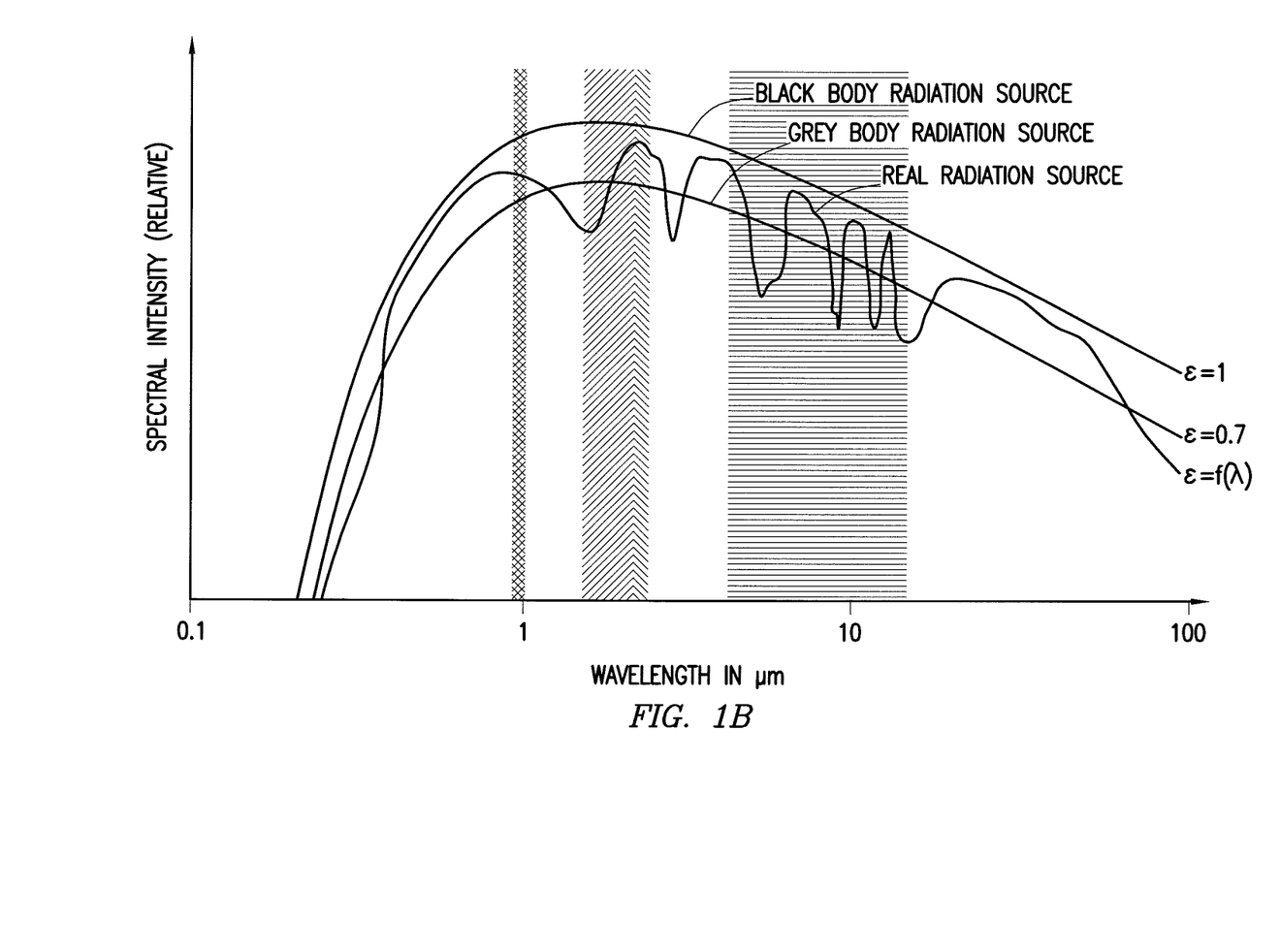

As stated above, a black body is characterized by an emissivity $\epsilon=1$. Alternatively, objects that have an emissivity that is less than 1 but otherwise continues to emit according to Plank's law are called grey bodies. In general, however, many real-world objects have emissivities that depend on the frequency v. FIG. 1B shows examples of the thermal emission spectra from a hypothetical black body, a hypothetical grey body, and a hypothetical real object.

Thus, by measuring all of, or even a portion of, the emitted thermal radiation, it becomes possible to infer the temperature of a black body. Alternatively, if the emissivity of the object is known, the temperature of a grey body or real object may be determined by measuring all of, or even a portion of, the emitted thermal radiation.

A typical radiation pyrometer may include an optical system, for example, including one or more lenses and a narrow-pass optical filter. Accordingly, the optical system collects only a small range of frequencies v of the emitted thermal radiation from an object. Furthermore, the optical system has a finite field of view resulting in the collection of a portion, or beam, of emitted thermal radiation. The size and angular divergence of this collection beam depends on the details of the optical system. If the emissivity of the object is well known and the collection beam is narrow enough, the radiation pyrometer may provide a very accurate noncontact measurement of the object's temperature.

Accordingly, pyrometers are often employed to measure temperatures in harsh environments, for example in the high-temperature environments found near and even within various forms of casting furnaces. In practice, pyrometers are calibrated by using known temperatures in the environment that are linked to an energy value measured by the detector. All other temperatures may then be calculated relative to these points via the Planck relation.

SUMMARY

In general, in one aspect, the invention relates to a method and a non-transitory computer readable medium storing a plurality of computer executable instructions for calibrating an uncalibrated thermal imager. The method includes setting a region of interest in a field of view of the thermal imager, and determining a first temperature of the region of interest using a calibrated pyrometer under a first condition. The method further includes determining a first average count value over the region of interest using the uncalibrated thermal imager under the first condition and determining a second temperature of the region of interest under a second condition. A second average count value is determined over the region of interest using the uncalibrated thermal imager under the second condition. A Planck function is determined that intersects the points (first temperature, first average count value) and (second temperature, second average count value). The uncalibrated thermal imager is calibrated using the Planck function.

In general, in another aspect, the invention relates to system that includes a calibrated pyrometer for determining a first temperature of a Region of Interest under a first condition, and an uncalibrated thermal imager for determining a first average count value over the region of interest under the first condition and for determining a second average count value over the region of interest under a second condition. The system also includes a temperature sensor for determining a second temperature of the region of interest under a second condition. The system further includes control electronics for determining a Planck function that intersects the points (first temperature, first average count value) and (second temperature, second average count value) and for calibrating the uncalibrated thermal imager using the Planck function.

Other aspects and advantages of the present disclosure will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide for an apparatus and method that combines a non-radiometrically calibrated digital thermal imager, with a radiometrically calibrated single point pyrometer whose data streams are fused in software to create a radiometrically calibrated image. In one or more embodiments of the invention, the pyrometer's field of view spot is designated in the field of view of the imager's software. Then, the temperature output from the pyrometer may be used to estimate the scene temperature of the other pixels in the imager's field of view.

In accordance with one or more embodiments of the invention, the temperature calculation may be performed similarly to a standard radiometric calculation inside a thermopile pyrometer or a radiometric imager. In general, known temperatures may be determined by the calibrated pyrometer and linked to an energy value represented by an AD count value of the detector in the non-calibrated digital imager. All other temperatures may be calculated relative to this point via the Planck integral. In one or more embodiments of the invention, the spectral responses of imager and pyrometer may be identical for best results.

In accordance with one or more embodiments of the invention, the pyrometer may be included with the imager, or built into the same enclosure as the imager. In other embodiments, the pyrometer may be separate from the imager. The pyrometer and imager are both connected to control electronics for adjusting the imager as a result of the calibration. The connections to the control electronics may be wired or wireless.

Figure 2:
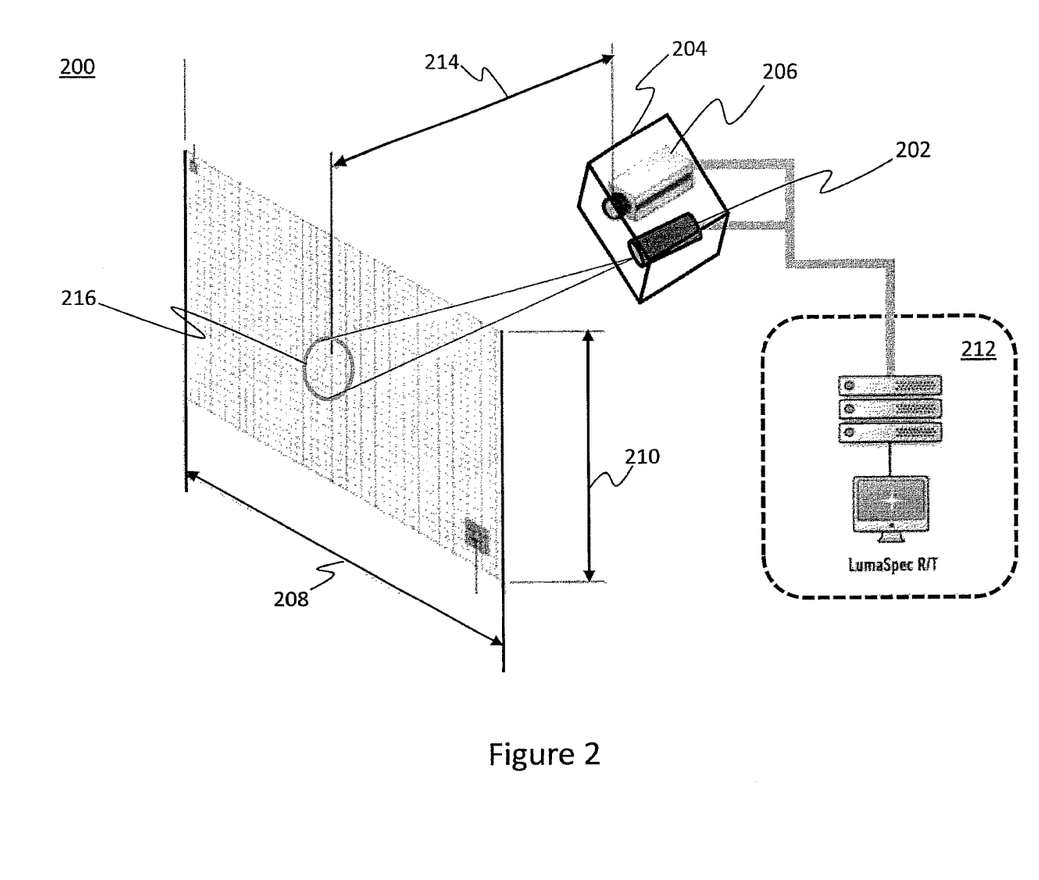
FIG. 2 shows a schematic in accordance with one or more embodiments of the invention.

FIG. 2 shows a schematic in accordance with one or more embodiments of the invention. The system 200 shown in FIG. 2 demonstrates an embodiment where the calibrated pyrometer 202 is incorporated into the same enclosure 204 as the digital imager 206. In accordance with one or more embodiments of the invention, the digital imager 206 has a horizontal field of view 208 and a vertical field of view 210. The pyrometer's 202 interrogation area is located within the field of view of the imager 206. The digital imager 206 and the pyrometer 202 are connected to control electronics 212 for calibrating the digital imager 206, as well as displaying the results and interfacing with a user. The geometry of the optical configuration, such as the distance 214 between the imager 206 and pyrometer 202 and a region of interest (ROI) 216, is known. In one or more embodiments, the size of the region of interest may be determined based on the spot size of the pyrometer 202 at the ROI 216.

Figure 3:
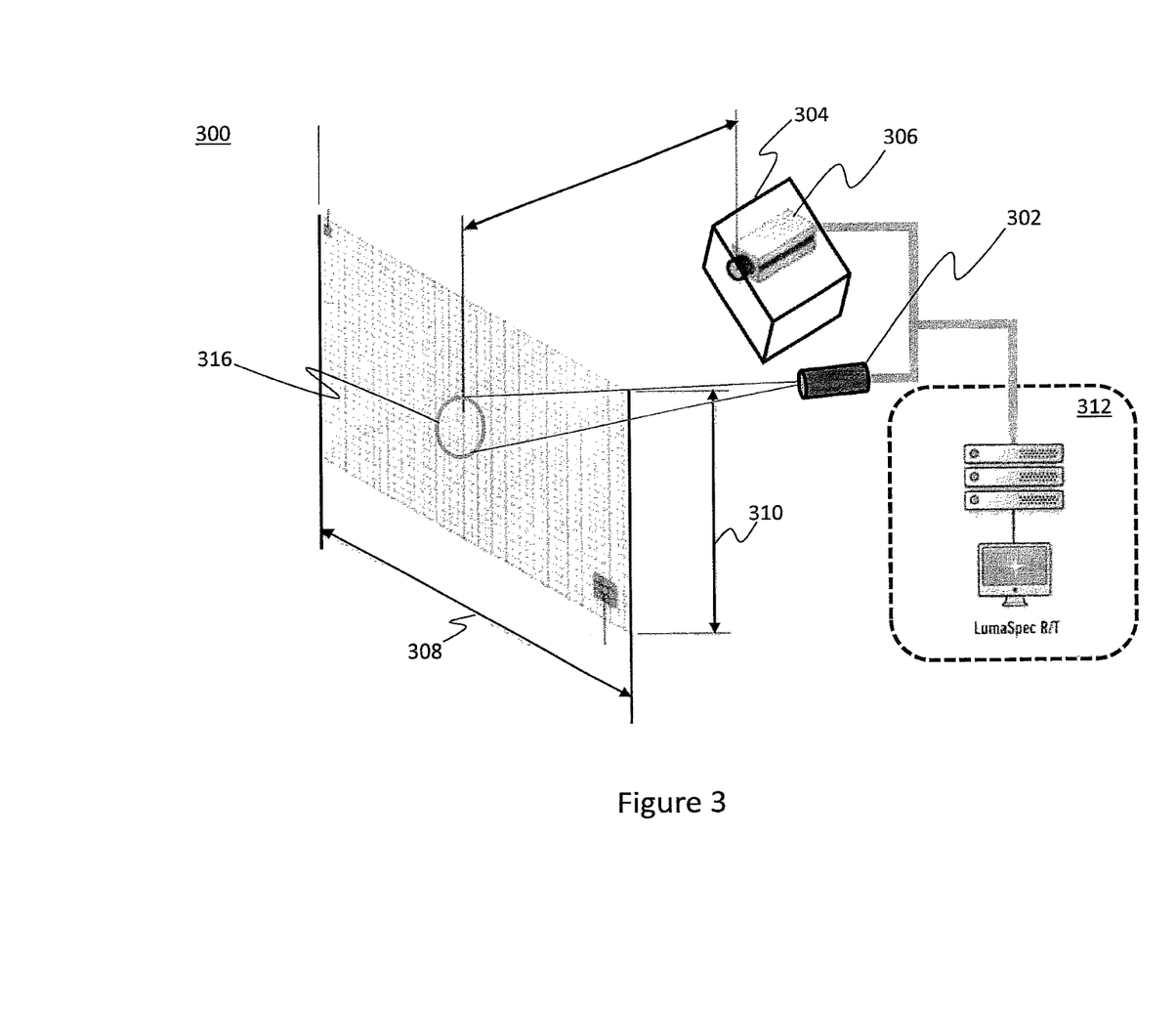
FIG. 3 shows a schematic in accordance with one or more embodiments of the invention.

FIG. 3 shows a schematic in accordance with one or more embodiments of the invention. The system 300 shown in FIG. 3 is similar to the system 200 of FIG. 2, except the calibrated pyrometer 302 is not within the enclosure 304 that contains the uncalibrated digital imager 306. Both the digital imager 306 and the pyrometer 302 are connected to the control electronics The pyrometer's 302 interrogation area is located within the horizontal field of view 308 and a vertical field of view 310. The geometry of the optical configuration of the imager 306 and pyrometer 302 is handled in the same fashion as in FIG. 2, with a region of interest (ROI) 316 within the field of view of the imager 306 and the pyrometer 302.

The detector of the imager outputs AD-counts, where the translation between incoming radiation energy and detector output may depend on a number of optical and electronic parameters. Because such parameters may vary from device to device, the relation between absolute energy value and resulting AD-counts may not be well predicted. In one or more embodiments of the invention, the imager may be calibrated by fitting the Planck-curve through AD-counts and temperature pairs, where the temperature is provided by the calibrated pyrometer.

Any bolometer is based on a resistor value change of the pixels when exposed to IR radiation. The readout circuitry has to convert the small temperature change caused by the radiation into a voltage change at the output. In a non-stabilized detector however the resistor changes caused by ambient temperature change is not only much larger than the resistor change caused by the scene radiation. This non-linear change also changes the slope of the resistance change over ambient temperature. This means the responsivity of the detector changes over ambient temperature. Typically, calibration of an imager has to include a calibration of ambient drift compensation. However, the calibration of ambient drift compensation may be avoided if the case of higher temperatures, in accordance with one or more embodiments of the invention.

A minimum calibration requires at least two pairs of known temperature and AD-counts in order to fit the Planck curve in accordance with one or more embodiments of the invention. In one or more embodiments, two values of AD-counts, as determined by the imager, may be paired with two different temperatures, as determined by the pyrometer. Such pairs may be stored in the imager or control electronics, and they used to fit the Planck curve to calibrate the imager.

Figure 4:
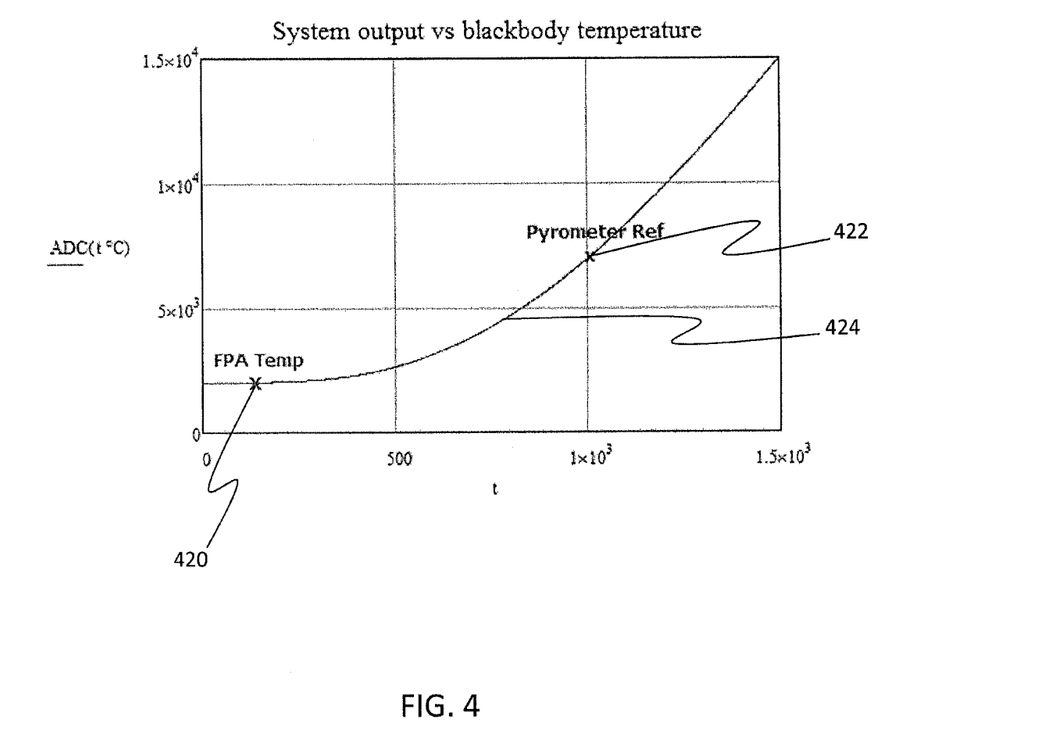
FIG. 4 shows a graph of the imager output vs. blackbody temperature in accordance with one or more embodiments of the invention.

Referring to FIG. 4, in one or more embodiments, if the temperature of the pyrometer reading is different enough from the internal temperature, the shutter temperature may be used as one of the points used for fitting the Planck curve. If a temperature sensor is available at the shutter, the temperature reading of sensor and the AD-counts at the shutter 420 may be used as one of the two pairs required for calibration of the imager. The second pair may be the AD-counts averaged over the ROI, with the temperature reading of the ROI as read by the calibrated pyrometer 422. If no temperature sensor is available at the shutter, the Focal Plane Array (FPA) internal temperature sensor may be used as closest approximation. The two points are then fit to the Planck curve 424. The resulting curve may then be used to calibrate the output of the digital imager. In one or more embodiments, the fit may be performed with each change of FPA temperature, pyrometer reading, or new shutter cycle. The fit may then be used to calibrate the output of the digital imager. The calibration may be triggered by a user, or may be performed automatically based on a detected change in temperature by the imager or pyrometer. In one or more embodiments, the temperature for other areas of the scene may also be estimated.

Figure 5:
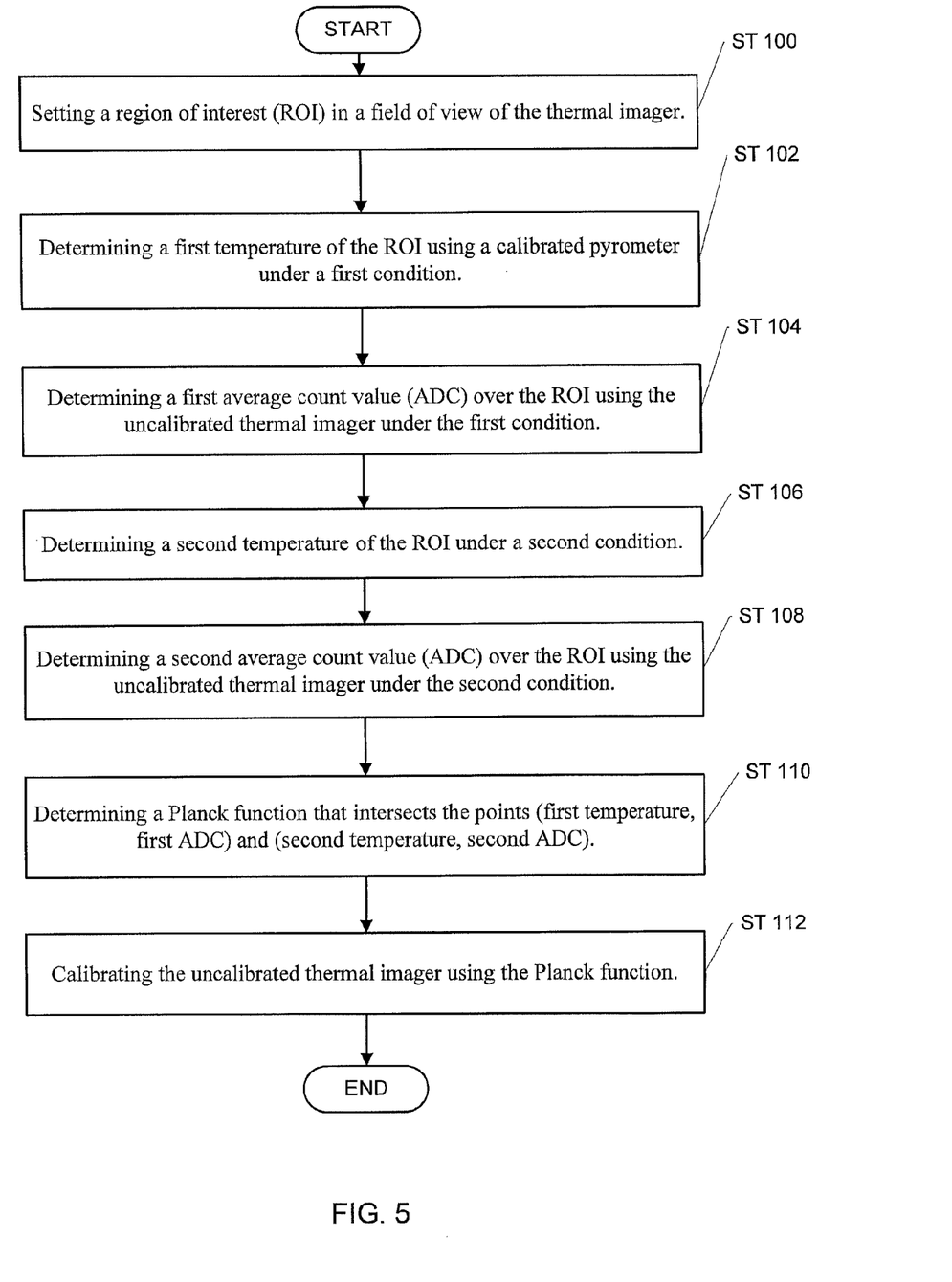
FIG. 5 is a flow chart in accordance with one or more embodiments of the invention.

FIG. 5 demonstrates a flow chart of a method in accordance with one or more embodiments of the invention. In ST 100, a region of interest (ROI) within a field of view of the thermal imager is set. A first temperature of the ROI is determined using the calibrated pyrometer under a first condition in ST 102. In ST 104, the thermal imager determines a first average count value (ADC) over the ROI under the same first condition. In ST 106, a second temperature of the ROI is determined under a second condition. As described above, the second condition may be when the shutter is closed, i.e., the shutter temperature in accordance with one or more embodiments. The Focal Plane Array (FPA) temperature may also be used in accordance with one or more embodiments of the invention. In other embodiments, the conditions may be changed, and the same calibrated pyrometer may be used to determine the second temperature, provided the second condition is such that the different between the first and second temperature is significant.

In ST 108, a second ACD is determined over the ROI using the uncalibrated thermal imager under the second condition. In ST 110, a Planck curve is fit to the points determined by ST 102 to ST 108. With the Planck curve, the uncalibrated thermal imager is calculated in ST 112.

One or more embodiments of the invention may provide technology which makes accurate thermal imaging far more accessible, so that operators may monitor an entire object or process instead of just a small portion. By driving the thermal image palette through a calibrated radiometric pyrometer capable of precise temperature readings, embodiments may provide relatively radiometric infrared imaging at a significantly lower cost than fully radiometric imagers.

One or more embodiments of the invention may be readily integrated with existing industrial monitoring and control systems via the Open Process Control (OPC) interoperability standard for industrial automation. One or more embodiments of the invention may be applied to existing imagers or pyrometers in the field to enhance process performance, regardless of make and model.

Embodiments of the invention are ideal for industries where it's critical to know the temperature of an object, as well as uniformity across an object at that temperature. For example, many processes in metals and glassmaking that use a single pyrometer to measure temperature may be improved with one or more embodiments of the invention, for example, steelmaking processes like ladle preheat, torpedo car monitoring, and annealing furnace operations. With the more precise temperature measurements that one or more embodiments of the invention provide, the life of a pouring ladle or torpedo car may be extended by 20% and energy usage for preheat operations reduced by 10%.

Figure 6:
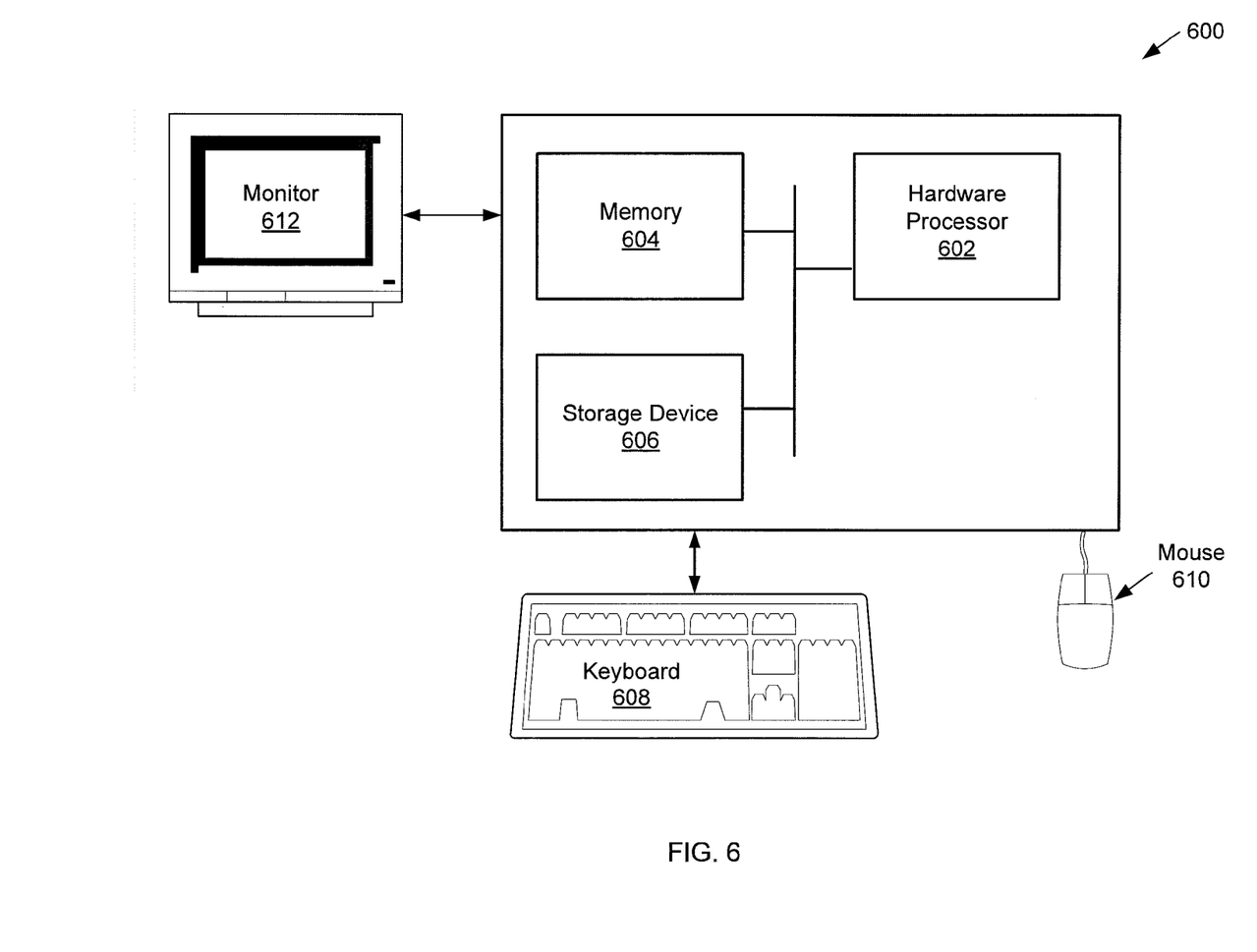
FIG. 6 shows a schematic of a computer system in accordance with one or more embodiments of the invention.

Embodiments of the invention may be implemented on virtually any type of computer regardless of the platform being used. For example, as shown in FIG. 6, a computer system 600 includes one or more hardware processor(s) 602 (such as a central processing unit (CPU), integrated circuit, etc.), associated memory 604 (e.g., random access memory (RAM), cache memory, flash memory, etc.), a storage device 606 (e.g., a hard disk, an optical drive such as a compact disk drive or digital video disk (DVD) drive, a flash memory stick, etc.), and numerous other elements and functionalities typical of today's computers (not shown). The computer system 600 may also include input means, such as a keyboard 608, a mouse 610, or a microphone (not shown). Further, the computer system 600 may include output means, such as a monitor 612 (e.g., a liquid crystal display (LCD), a plasma display, or cathode ray tube (CRT) monitor) or audio speakers (not shown). The computer system 600 may be connected to a network (not shown) (e.g., a local area network (LAN), a wide area network (WAN), the Internet, or any other type of network) via a network interface connection (not shown). Those skilled in the art will appreciate that many different types of computer systems exist, and the aforementioned input and output means may take other forms. Generally speaking, the computer system 600 includes at least the minimal processing, input, and/or output means necessary to practice embodiments of the invention.

Further, in one or more embodiments of the invention, one or more elements of the aforementioned computer system 600 may be located at a remote location and connected to the other elements over a network. Further, embodiments of the invention may be implemented on a distributed system having a plurality of nodes, where each portion of the invention (e.g., printer driver, energy consumption module, etc.) may be located on a different node within the distributed system. In one embodiment of the invention, the node corresponds to a computer system. Alternatively, the node may correspond to a processor with associated physical memory. The node may alternatively correspond to a processor or micro-core of a processor with shared memory and/or resources. Further, software instructions in the form of computer readable program code to perform embodiments of the invention may be stored, temporarily or permanently, on a tangible computer readable storage medium, such as a compact disc (CD), a diskette, a tape, memory, or any other tangible computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for calibrating an uncalibrated thermal imager, the method comprising:
    setting a region of interest in a field of view of the uncalibrated thermal imager;
    determining a first temperature of the region of interest using a calibrated pyrometer under a first shutter condition;
    determining a first average count value over the region of interest using a digital pixel output of the uncalibrated thermal imager under the first shutter condition;
    determining a second temperature of the region of interest under a second shutter condition;
    determining a second average count value over the region of interest using a digital pixel output of the uncalibrated thermal imager under the second shutter condition;
    determining a Planck function by fitting a Planck curve to the first temperature, the first average count value, the second temperature and the second average count value using a processor; and
    calibrating the uncalibrated thermal imager using the determined Planck function.

2. The method of claim 1, wherein the second temperature is determined by a thermocouple.

3. The method of claim 1, wherein the second temperature is determined by the calibrated pyrometer.

4. The method of claim 1, wherein the second shutter condition occurs when a shutter is closed.

5. The method of claim 1, wherein the second temperature is a shutter temperature.

6. The method of claim 1, wherein the second temperature is a focal plane array temperature.

7. The method of claim 1, wherein a spectral response of the calibrated pyrometer and a spectral response of the uncalibrated thermal imager are the same.

8. The method of claim 1, wherein a size of the region of interest is the same as an interrogation area of the pyrometer.

9. A system comprising:
    a calibrated pyrometer for determining a first temperature of a region of interest under a first shutter condition;
    an uncalibrated thermal imager for determining a first average count value based on a digital pixel output of the uncalibrated thermal imager over the region of interest under the first shutter condition and for determining a second average count value based on a digital pixel output of the uncalibrated thermal imager over the region of interest under a second shutter condition;

a temperature sensor for determining a second temperature of the region of interest under the second shutter condition;

control electronics for determining a Planck function by fitting a Planck curve to the first temperature, the first average count value, the second temperature and the second average count value using a processor and for calibrating the uncalibrated thermal imager using the determined Planck function.

10. The system of claim 9, wherein the temperature sensor is a thermocouple.

11. The system of claim 9, wherein the temperature sensor is the calibrated pyrometer.

12. The system of claim 9, wherein the second shutter condition occurs when a shutter is closed.

13. The system of claim 9, wherein the second temperature is a shutter temperature.

14. The system of claim 9, wherein the second temperature is a focal plane array temperature.

15. The system of claim 9, wherein a spectral response of the calibrated pyrometer and a spectral response of the uncalibrated thermal imager are the same.

16. The system of claim 9, wherein a size of the region of interest is the same as an interrogation area of the pyrometer.

17. The system of claim 9, wherein the calibrated pyrometer and the uncalibrated thermal imager are located in the same enclosure.

18. A non-transitory computer readable medium storing a plurality of computer executable instructions for calibrating an uncalibrated thermal imager, the computer executable instructions comprising functionality to:

set a region of interest in a field of view of the uncalibrated thermal imager;

determine a first temperature of the region of interest using a calibrated pyrometer under a first shutter condition;

determine a first average count value over the region of interest using a digital pixel output of the uncalibrated thermal imager under the first shutter condition;

determine a second temperature of the region of interest under a second shutter condition;

determine a second average count value over the region of interest using a digital pixel output of the uncalibrated thermal imager under the second shutter condition;

determine a Planck function by fitting a Planck curve to the first temperature, the first average count value, the second temperature and the second average count value using a processor; and calibrate the uncalibrated thermal imager using the determined Planck function.

19. The non-transitory computer readable medium of claim 18, wherein the temperature sensor is the calibrated pyrometer.

20. The non-transitory computer readable medium of claim 18, wherein the second shutter condition occurs when the shutter is closed.

* * * * *